United States Patent [19]

Matsumoto et al.

[11] Patent Number: 4,552,724
[45] Date of Patent: Nov. 12, 1985

[54] REACTION AND HEAT EXCHANGER APPARATUS

[75] Inventors: Tadao Matsumoto, Takasago; Kazuo Inoue, Kakogawa, both of Japan

[73] Assignee: Shinko-Pfaudler Company, Ltd., Kobe, Japan

[21] Appl. No.: 599,279

[22] Filed: Apr. 11, 1984

Related U.S. Application Data

[63] Continuation of Ser. No. 353,884, Mar. 2, 1982, abandoned.

[30] Foreign Application Priority Data

Mar. 9, 1981 [JP] Japan ................................. 56-34114

[51] Int. Cl.[4] ............................................. F28D 21/00
[52] U.S. Cl. ................................... 422/138; 165/169; 228/173.6; 228/183; 228/184; 422/205
[58] Field of Search ............... 422/137, 138, 205, 241, 422/242; 165/169; 228/184, 183, 173 C

[56] References Cited

U.S. PATENT DOCUMENTS

| | | | |
|---|---|---|---|
| 825,905 | 7/1906 | Hellyer | 165/169 |
| 2,301,204 | 11/1942 | Fields et al. | 422/138 |
| 2,772,784 | 12/1956 | Cyphers et al. | 165/169 |
| 2,847,284 | 8/1958 | Busey | 422/205 |
| 3,374,833 | 3/1968 | Bernard | 165/169 |
| 3,592,609 | 7/1971 | Honbo | 422/205 |
| 4,036,596 | 7/1977 | Ogoshi et al. | 422/205 |
| 4,107,410 | 8/1978 | Toekes | 526/73 |

FOREIGN PATENT DOCUMENTS

| | | | |
|---|---|---|---|
| 767761 | 10/1971 | Belgium | 165/169 |
| 450922 | 8/1948 | Canada | 165/169 |
| 258273 | 4/1928 | Italy | 165/169 |
| 2598 | 2/1940 | Japan . | |
| 35325 | 12/1971 | Japan . | |
| 1375 | 1/1972 | Japan . | |
| 18205 | 6/1975 | Japan . | |
| 29196 | 8/1976 | Japan . | |
| 82289 | 6/1980 | Japan . | |
| 0606611 | 5/1978 | U.S.S.R. | 422/138 |

*Primary Examiner*—Barry S. Richman
*Assistant Examiner*—William R. Johnson
*Attorney, Agent, or Firm*—Marshall, O'Toole Gerstein, Murray & Bicknell

[57] ABSTRACT

A reaction vessel including a generally cylindrical center part and two plates or discs which are secured to and close the ends of the center part. The reactant is fed into the interior of the vessel where the polymerization or other chemical reaction takes place. A heat transfer or heat exchanger system is formed by a smooth liner that is mounted coaxially with and within the interior of the center part. The liner is spaced from the center part and it is secured to the center part by a plurality of support portions. The support portions serve both to brace the liner so that it can withstand the pressure of the reactant, and as partitions which form flow paths for a coolant, between the liner and the center part. Further, the liner includes a plurality of strip portions having a width which is substantially equal to the distance between said support portions, said strip portions extending substantially parallel to each other and to said support portions, and said strip portions extending between the radially inner edges of two support portions.

8 Claims, 5 Drawing Figures

FIG. 1
PRIOR ART
FIG. 2
FIG. 3
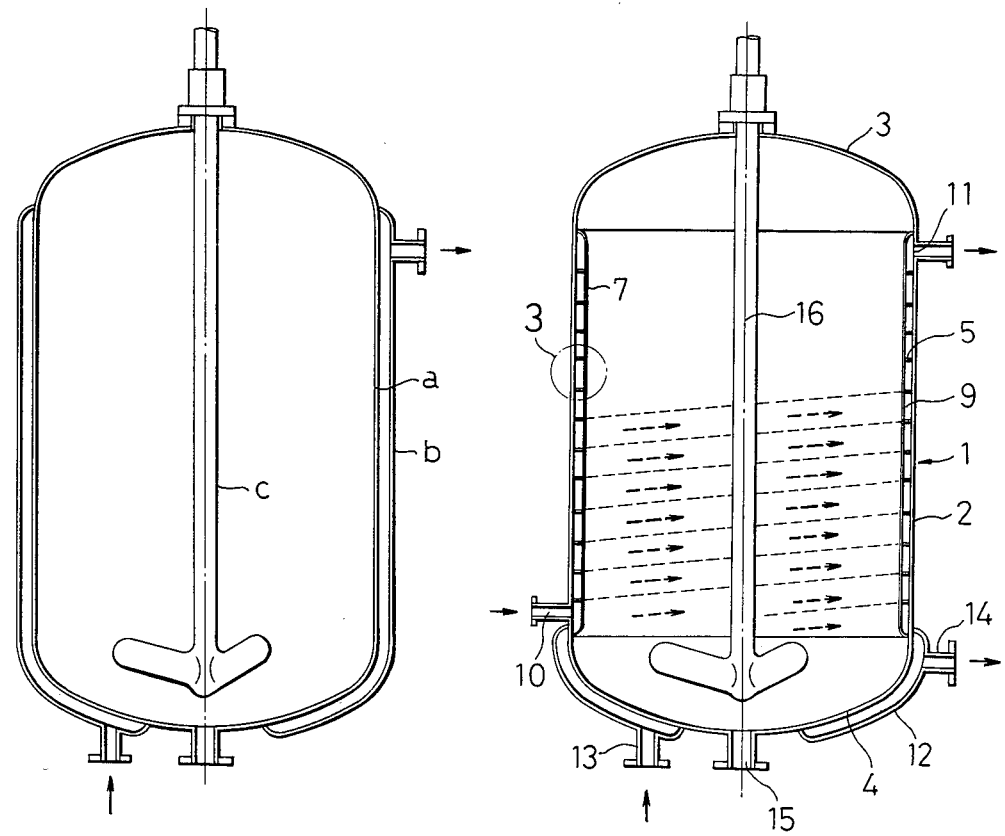
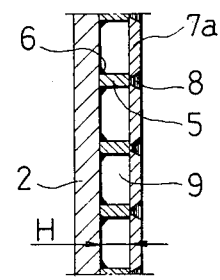

REACTION AND HEAT EXCHANGER APPARATUS

DETAILED DESCRIPTION

This is a continuation of application Ser. No. 353,884, filed Mar. 2, 1982, now abandoned.

This invention relates to a polymerization or reaction apparatus, particularly for use in a suspension polymerization process for vinyl chloride or polyolefin.

In the prior art, as shown in FIG. 1 of the accompanying drawings, such apparatus has included a pressure-proof closed vessel a including a cylindrical center section that has both ends closed by dish-like mirror plates or discs welded to the center part. The container is strong enough to withstand, for example, 12-15 kg/cm$^2$ polymerization pressure. The vessel is partially surrounded by an outer sleeve b to form a space between the section and the sleeve, through which water or another form of coolant is passed. There is an exchange of heat through the vessel wall to remove the reaction heat generated by the polymerization process within the vessel, in order to maintain a suitable reaction temperature. An agitator c within the vessel serves to equalize the temperature therein as well as the quality of the reactant, thus contributing to the removal of reaction heat. Because the polymerization produces a large amount of reaction heat, such heat removal is a rate-determining factor of the reaction speed, and consequently it controls the amount of the product produced by the apparatus.

In the meantime, it has been desired that the polymerization apparatus be larger in size to increase the production rate, but such an increase causes problems in regard to the heat removal. Specifically, a larger apparatus requires that its vessel have a thicker wall to maintain the necessary strength, thus lowering the amount of heat transfer through the wall. Also, the larger size vessel reduces the amount of area of the vessel wall available to cool a unit of volume of the reactant within the container. Thus, these factors prevent an increase of the heat removal, thereby reducing the amount of production of a unit volume of the container.

Alternative prior art arrangements for removing the heat other than such an outer sleeve, take the form of cooling tubes provided within the vessel, or baffles provided within it to serve as cooling surfaces. However, such internal means result in serious polymer adhesion and accumulation within the vessel.

Still other conventional heat-removing means take the form of a reflux cooler provided outside the vessel, or an external cooler for cooling the liquid withdrawn from the vessel and returning the cooled liquid to the vessel. Such external coolers necessitate attention to their operation and involve higher costs.

To provide an ordinary inner heat-exchanger sleeve in place of and similar to the above discussed outer sleeve would not be satisfactory. This alternative reduces the heat exchanger area available because of the smaller diameter of the inner sleeve as compared with the vessel. If the inner sleeve is constructed to be supported at both of its ends, similarly to the outer sleeve, and if the pressure of the coolant passing through an annular space between the inner sleeve and vessel wall is lower than the pressure inside the vessel, the inner sleeve would have to have a wall strong enough to bear the differential pressure across it. Accordingly, the wall of the inner sleeve must have a thickness approximately equal to that of the vessel wall. This thickness reduces the heat exchange function.

It is a primary object of this invention to provide a reaction apparatus including a vessel, wherein the heat removal from it at the vessel wall is improved without the necessity of cooling means provided outside the vessel or internal members within the liquid reactant.

A reaction or polymerization apparatus according to this invention comprises a reaction vessel, a smooth liner provided over at least part of the inner side of said vessel and forming a space between it and said inner side, said liner being secured to said inner side by means of a support that also serves as a partition forming a path for a heat exchange medium of heat or coolant in said space, said liner thus being able to withstand the polymerization pressure.

More particularly, such apparatus comprises a vessel for a reactant, a liner extending inside at least part of said vessel and spaced from the wall of said container, the space between said liner and wall being separated from the remaining volume of said vessel, said wall having openings formed therethrough which are enclosed by said liner, the openings being employed to introduce a medium of heat or coolant into and to withdraw it from said space, and a support extending within said space and secured to said wall and at least partly to said liner, whereby said support braces said liner on said wall and forms a partition which defines a path for the medium to flow through said space between said openings.

Preferred embodiments of this invention are described as follows in conjunction with FIGS. 2-5 of the drawings, wherein:

FIG. 1 is a sectional view showing a prior art apparatus;

FIG. 2 is a sectional view of the apparatus in accordance with a first embodiment of the invention;

FIG. 3 is an enlarged sectional view of the circled portion of the apparatus shown in FIG. 2;

Figure 4:
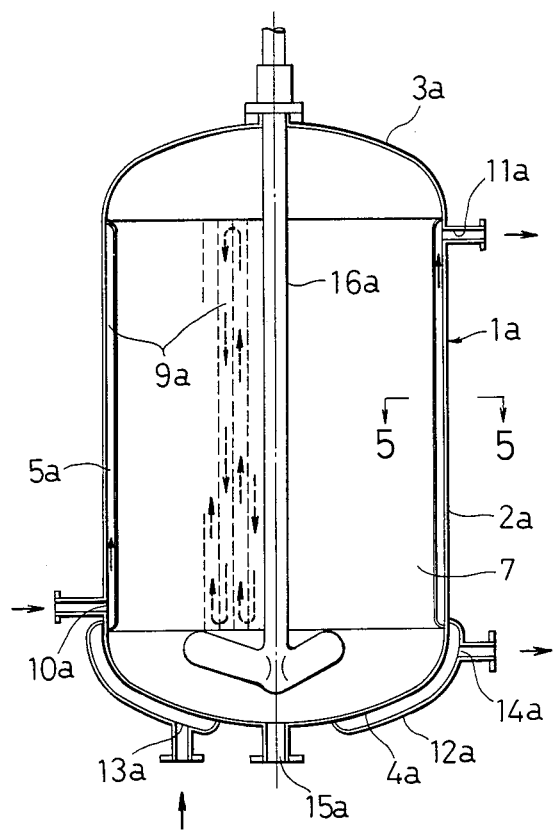
FIG. 4 is a view similar to FIG. 2 but showing a second embodiment of the invention.

FIGS. 2 and 3 show a pressure-proof closed vessel 1 formed by a cylindrical center part 2 that has both ends closed by upper and lower dish-like mirror discs 3 and 4 which are welded to the center part 2. The vessel 1 is sufficiently strong to bear the pressure within it.

A support member or brace 5 extends spirally at a predetermined pitch entirely or partially over the inner side of the vessel 1. In the embodiment shown in FIGS. 2 and 3, the member 5 extends over the whole length of the center part 2. As best shown in FIG. 3, the support 5 forms a short radial partition or wall that is perpendicular to and welded at its outer edge to the part 2, the weld being indicated by the numeral 6.

A liner 7 is secured to the inner edges of the support 5 and may take the form of a strip 7a that is thinner than the wall of the container 1. As best shown in FIG. 3, the strip 7a spirally extends between adjacent coils of the support 5 and is welded at 8 at its edges to the radially inner edges of adjacent coils of the support 5. Instead of the arrangement shown, the strip 7a may be wider than and welded between two or more coils of the support 5, thereby skipping one or more coils. The strip 7a and the support 5 thus form, with the central part 2, a spiral path or passage 9 inside the part 2, as shown by the dashed lines in FIG. 2, the support 5 serving as a path partition and as a brace for the liner. The path 9 has flat and smooth inner surfaces and a width H equal to that of support 5 between the part 2 and the liner 7. The height of the path 9 is determined by the pitch or distance between adjacent coils of the support 5.

The top and bottom edges of whole liner 7 are turned radially outwardly and welded to the wall of the center part 2, to separate the path 9 from the interior of vessel 1. A bottom inlet 10 and a top outlet 11 are formed through the wall of vessel 1 and are connected to opposite ends of the path 9, in order to pass a coolant (or a medium of heat if the process requires it) through the path 9.

Provided on the outer side of lower mirror disc 4 is an annular outer jacket 12 (FIG. 2) which forms an annular space over the outer surface of the disc 4. The jacket 12 has an inlet 13 and an outlet 14 on opposite sides thereof, for a coolant to be passed through the annular space between the jacket and the disc 4.

In FIG. 2, the coolant flow directions are indicated by the arrows. When the heat exchange liquid is circulated to cool the reactant, the flow may be from the bottom to the top in order to take advantage of the normal convection flow. The vessel 1 may be formed with a bottom outlet 15 and an inlet (not shown) for the reaction liquid, and an agitator 16.

The spiral path 9 may in addition be extended to the inner surface of the lower mirror disc 4. Instead of a single spiral band as shown in FIGS. 2 and 3, the path 9 may be formed by a number of parallel rings that form annular spaces between them, each space communicating with the adjacent spaces by holes through the rings.

Figure 5:
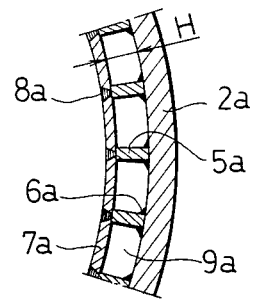
FIG. 5 is an enlarged fragmentary sectional view taken on the line 5—5 in FIG. 4.

The second embodiment is shown in FIGS. 4 and 5 and similar reference numerals to those shown in FIGS. 2 and 3 are employed for similar parts. In the second embodiment, a plurality of parallel, axially extending supports or partitions 5a are welded to the inner side of a cylindrical center part 2a, and axial or cylindrical lining strips 7a form a plurality of axial paths 9a inside the center part 2a.

Each path 9a communicates with the adjacent path at either the upper or lower end, so that the coolant flows in a zigzag pattern through the paths, as shown by the dashed flow lines and arrows in FIG. 4. The communication between paths is by holes (not shown) formed through the bottoms of alternate supports and through the tops of the intermediate supports. Each lining strip 7a is welded at both edges to the radially inner edges of two adjacent supports 5a, or they may be wide enough to extend across one or more supports and be welded to, for example, every second or third support. In the latter event, there should, of course, be a close fit between the supports 5a and the strips 7a to produce the zigzag flow pattern.

The thickness of the liner 7 is determined depending on the pitch of spiral support 5 or by the space between the axial supports 5a, and they should be sufficiently closely spaced to withstand the pressure of polymerization liquid inside the vessel 1. Because the pitch or space is much less than the length of center parts 2 and 2a, the liner 7 can be very thin as compared with the wall 2 or 2a. In other words, the portions of the liner 7 between the adjacent turns of the supports 5 or 5a are required to bear only a divided portion of the pressure inside the vessel 1, and the wall of center part 2 and 2a ultimately bears the total pressure applied through the supports 5 or 5a.

This relatively thin liner increases, and may at least double, the heat transfer between the reactant within the container 1 or 1a and the coolant within the peripheral paths 9 or 9a.

Depending on the amount of the available coolant, the supports 5 and 5a and the liner 7 may be constructed so that the coolant paths 9 or 9a flow in parallel groups, instead of in a single stream.

The rate at which the coolant flows may be suitably selected to minimize the pressure losses and improve the heat transfer.

Since there also is a liquid pressure on the coolant side of the liner 7, the liner 7 is welded either entirely or partly to the support 5 or supports 5a, depending on the pressure difference across the liner. The liner may be thinned depending on the pressure on the coolant side, to improve the heat transfer. In other words, if the coolant pressure is kept equal to the internal pressure of the vessel, the liner may be quite thin.

The liner may be made of stainless steel, nickel or other material that is chemically resistant to the reactant within the vessel. On the other hand, the part of the vessel wall 2 or 2a which is covered by the liner may be made of material which is inexpensive but mechanically strong. Since the inner side of the prior art reaction vessels was entirely subjected to the contained reactant liquid, the vessels themselves had to be made with a large amount of corrosion-resistant material, and such material is relatively expensive. By contrast, according to this invention, only the liner, which is relatively thin, need be made of such expensive material. Also, the applicant's liner may be made of a clad or coated material, thereby further reducing the amount of the expensive material needed for the apparatus.

The following is a comparison of this invention with a split tube or a tube that is semi-circular in cross section, such a tube being provided inside the vessel in place of an outer cooling sleeve as shown in FIG. 1.

A split tube would appear to geometrically increase the heat transfer area by 57%, but as a practical matter this is not the case. This is true because two adjacent portions of each split tube form an acute bottom groove between them, which is a dead space with respect to the reactant flow or movement by agitation. Also, the reactant tends to stick to and accumulate in the groove. As a result, this groove does not participate sufficiently in the heat transfer, so that the effective heat transfer area is not greatly increased as compared with a smooth inner wall.

Moreover, the reactant stuck to the inner surfaces of the vessel are commonly removed by injecting a stream of high-pressure water into the vessel. It is difficult to remove the reactant accumulated in the grooves, and the removing operation reduces the effective working time of the apparatus. By contrast, the applicant's vessel has a smooth inner surface in contact with the reactant liquid, thereby minimizing the polymer accumulation and facilitating its removal.

Thus, this invention enables the liner that is in contact with the liquid within the vessel to be made effectively thinner than the vessel wall. This thinness improves the heat transfer characteristics, and it is even further improved if there is also an increase of the coolant flow rate which is possible by this invention. The polymer accumulation is reduced and can be easily removed after a batch operation, thereby improving the effective operating time of the apparatus. The welding operation is relatively easy, facilitating the manufacture of the apparatus. Further, the need for expensive materials is reduced.

The invention has the further advantages that the belts or strips 5 and 5a also serve as heat conducting fins which are immersed in the coolant, thereby increasing the effectiveness of the transfer of heat to the coolant. Further, the single, relatively narrow heat flow path of the coolant effectively avoids the formation of pockets or areas of slowly circulating coolant which might form in a large area flow path in prior art arrangements of the type shown in FIG. 1.

What is claimed is:

1. A reaction apparatus comprising a pressure proof vessel for a reactant under relatively high pressure, said vessel being formed by:
   (a) a generally cylindrical outer wall;
   (b) a generally cylindrical inner liner having a substantially smooth interior surface, said liner being positioned substantially concentrically within said outer wall and spaced from said outer wall, said space between said wall and said liner being separated from the interior volume of said liner, and said inner liner having a radial dimension that is substantially less than said outer wall;
   (c) a support positioned in said space, said support including a plurality of support portions that extend substantially radially from said outer wall to said inner liner, said plurality of support portions extending generally parallel to each other and being separated to form flow paths therebetween, the width of each path being substantially equal to the radial width of said support portions and the height of said paths being equal to the distance between said support portions;
   (d) said liner including a plurality of strip portions having a width which is substantially equal to the distance between said support portions, said strip portions extending substantially parallel to each other and to said support portions, and said strip portions extending between the radially inner edges of two support portions;
   (e) weld metal securing said strip portions to said radially inner edges of said support portions to form a substantially smooth continuous interior surface;
   (f) weld metal securing said outer wall to the radially outer edges of said support portions and;
   (g) said outer wall having a plurality of flow openings therein leading to said flow paths.

2. Apparatus according to claim 1, wherein said support portions extend generally circumferentially and are axially spaced and are interconnected end-to-end to form a spiral, and said strip portions extending generally circumferentially and being interconnected end-to-end to form a spiral.

3. Apparatus according to claim 1, wherein said support portions extend generally in the axial direction of said cylindrical wall and are circumferentially spaced, and said strip portions extend generally in said axial direction and are circumferentially spaced.

4. Apparatus according to claim 1, wherein said strip portions have a width that is substantially equal to the spacing between adjacent support portions, and each strip portion bridges and is welded to two adjacent support portions.

5. A method of making a reaction vessel including a generally cylindrical outer wall, a generally cylindrical liner spaced interiorly from said wall, and a support in the space between said wall and said liner, said method comprising the steps of:
   (a) fabricating said generally cylindrical wall of a weldable metal;
   (b) forming a plurality of elongated metal support portions;
   (c) positioning said support portions on the interior surface of said outer wall at substantially regularly spaced locations;
   (d) welding said support portions to said wall to form said support;
   (e) forming a plurality of elongated metal liner portions having a radial dimension that is substantially less than said outer wall and a width that is substantially equal to the distance between said support portions;
   (f) positioning the side edges of said liner portions against the radially inner edges of said support portions; and
   (g) welding said side edges of said liner portions to adjacent liner portions and to said support portions to form a substantially smooth continuous interior liner surface and flow paths between said support portions.

6. The method according to claim 5, wherein said support portions are positioned to extend generally circumferentially of said wall and are interconnected in end-to-end relation to form a spiral, and said liner portions are positioned to extend generally circumferentially of said wall and are interconnected in end-to-end relation to form a spiral.

7. The method according to claim 5, wherein said support portions and said liner portions are positioned to extend substantially parallel to the axis of said cylindrical wall.

8. The method according to claim 5, wherein said liner portions are formed having a width that is substantially equal to the spacing between adjacent support portions, and each liner portion is welded to two adjacent support portions.

* * * * *